United States Patent
Chigusa et al.

(10) Patent No.: US 8,304,132 B2
(45) Date of Patent: Nov. 6, 2012

(54) FUEL CELL

(75) Inventors: Hisashi Chigusa, Yokohama (JP); Katsumi Ichikawa, Kumagaya (JP); Hitoshi Koda, Yokohama (JO); Akiko Fujisawa, Kawasaki (JP); Shinichi Onodera, Tokyo (JP); Hiroaki Wakamatsu, Yokohama (JP); Shinichi Kanbayashi, Yokohama (JP); Naoyuki Takazawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/165,323

(22) Filed: Jun. 21, 2011

(65) Prior Publication Data

US 2011/0275001 A1 Nov. 10, 2011

Related U.S. Application Data

(63) Continuation of application No. PCT/JP2009/071173, filed on Dec. 18, 2009.

(30) Foreign Application Priority Data

Dec. 26, 2008 (JP) ................................ 2008-334003

(51) Int. Cl.
*H01M 8/10* (2006.01)
(52) U.S. Cl. ........ 429/483; 429/482; 429/481; 429/480; 429/479; 429/465
(58) Field of Classification Search .................. 429/483, 429/482, 481, 480, 479, 465
See application file for complete search history.

(56) References Cited

U.S. PATENT DOCUMENTS

| 2004/0146772 A1* | 7/2004 | Miyao et al. ................... 429/38 |
| 2005/0219493 A1 | 10/2005 | Oshida et al. |

FOREIGN PATENT DOCUMENTS

| JP | 2005-135715 | 5/2005 |
| JP | 2005-149803 | 6/2005 |
| JP | 2005-310641 | 11/2005 |
| JP | 2007-213830 | 8/2007 |
| JP | 2008-210714 | 9/2008 |
| JP | 2008-218305 | 9/2008 |

OTHER PUBLICATIONS

International Search Report from Japanese Patent Office for International Application No. PCT/JP2009/071173, Mailed Feb. 9, 2010.

* cited by examiner

*Primary Examiner* — Helen O Conley
(74) *Attorney, Agent, or Firm* — Finnegan, Henderson, Farabow, Garrett & Dunner, L.L.P.

(57) ABSTRACT

According to one embodiment, a fuel cell includes a membrane electrode assembly including a plurality of unit cells which are composed of an electrolyte membrane, an anode including anode catalyst layers arranged at intervals on one of surfaces of the electrolyte membrane, and anode gas diffusion layers stacked on the anode catalyst layers, and a cathode including cathode catalyst layers arranged at intervals on the other surface of the electrolyte membrane and opposed to the anode catalyst layers, respectively, and cathode gas diffusion layers stacked on the cathode catalyst layers, wherein a thickness of at least one of the anode catalyst layer and the cathode catalyst layer of one of the unit cells, which neighbor each other, gradually decreases toward the other of the unit cells.

5 Claims, 6 Drawing Sheets

| Inclination angle | SampleA1 | SampleA2 | SampleA3 | SampleA4 | SampleA5 | SampleA6 |
|---|---|---|---|---|---|---|
| | 30° | 45° | 60° | 75° | 80° | 90° |
| Initial time | Slight peeling of catalyst | No peeling or falling | No peeling or falling | No peeling or falling | No peeling or falling | Slight peeling of catalyst |
| After 500hr driving | Increase in amount of falling | Slight peeling and falling | No peeling or falling | No peeling or falling | Slight peeling and falling | Increase in amount of falling |
| Distance | 0.25mm | 0.1mm | 0.05mm or less | 0.05mm or less | 0.2mm | 0.5mm |
| Evaluation | △ | ○− | ○ | ○ | △ | × |

F I G. 6

| | SampleB1 | SampleB2 | SampleB3 | SampleB4 | SampleB5 | SampleB6 |
|---|---|---|---|---|---|---|
| Inclination angle | 30° | 45° | 60° | 75° | 80° | 90° |
| Initial time | Slight peeling of catalyst | No peeling or falling | No peeling or falling | No peeling or falling | No peeling or falling | Slight peeling of catalyst |
| After 500hr driving | Increase in amount of falling | Slight peeling and falling | No peeling or falling | No peeling or falling | Slight peeling and falling | Increase in amount of falling |
| Distance | 0.3mm | 0.15mm | 0.05mm or less | 0.1mm | 0.25mm | 0.6mm |
| Evaluation | △− | ○− | ○ | ○− | △ | × |

F I G. 7

F I G. 8

F I G. 9

FUEL CELL

CROSS-REFERENCE TO RELATED APPLICATIONS

This is a Continuation application of PCT Application No. PCT/JP2009/071173, filed Dec. 18, 2009, which was published under PCT Article 21(2) in Japanese.

This application is based upon and claims the benefit of priority from Japanese Patent Application No. 2008-334003, filed Dec. 26, 2008; the entire contents of which are incorporated herein by reference.

FIELD

Embodiments described herein relate generally to a fuel cell.

BACKGROUND

In recent years, attention has been paid to small-sized fuel cells. In particular, a direct methanol fuel cell (hereinafter referred to as "DMFC"), which uses methanol as fuel, is regarded as promising, since the size can be reduced and the handling of fuel is easy.

The DMFC includes a membrane electrode assembly (hereinafter "MEA") which is configured such that an electrolyte membrane is sandwiched between an anode and a cathode. In the anode of the DMFC, introduced methanol is oxidized and decomposed, and protons, electrons and carbon dioxide are produced. On the other hand, in the cathode, water is produced by a reaction between oxygen in the air, protons which have moved from the anode side, and electrons which are supplied from the anode via an external circuit. In addition, electric power is supplied by the electrons which flow through the external circuit.

As regards the DMFC, there is disclosed a structure wherein end portions of the MEA are inclined in the direction of stacking of layers in order to prevent short-circuit between the anode and the cathode. In addition, there is disclosed a structure wherein stepped portions in the direction of stacking of layers are formed at edge portions of a gas diffusion layer coupling body, and a protection film is coated on the stepped portions with such a thickness as to fill the stepped portions, thereby to prevent degradation of capability due to non-uniformity in surface-pressure distribution.

In the meantime, a voltage which is generated by the DMFC is lower than an ordinary cell, and is 1.21 V in cell voltage with no reversible loss. Thus, in the DMFC, such a method is adopted that a plurality of unit cells are laid over or arranged, and the unit cells are connected in series to increase a voltage. In particular, as regards a fuel cell which is required to occupy a smaller space, in many cases, plural unit cells are arranged in parallel and are connected in series by coupling anodes and cathodes by electrodes of a metal conductor.

However, in the case of arranging plural unit cells in parallel, there is a concern that neighboring anodes or cathodes are short-circuited by a catalyst falling from an anode catalyst layer or a cathode catalyst layer, and a predetermined voltage cannot be secured.

DETAILED DESCRIPTION

In general, according to one embodiment, a fuel cell includes a membrane electrode assembly including a plurality of unit cells which are composed of: an electrolyte membrane; an anode including a plurality of anode catalyst layers arranged at intervals on one of surfaces of the electrolyte membrane, and anode gas diffusion layers stacked on the anode catalyst layers; and a cathode including a plurality of cathode catalyst layers arranged at intervals on the other surface of the electrolyte membrane such that the cathode catalyst layers are opposed to the anode catalyst layers, respectively, and cathode gas diffusion layers stacked on the cathode catalyst layers, wherein a thickness of at least one of the anode catalyst layer and the cathode catalyst layer of one of the unit cells, which neighbor each other, gradually decreases toward the other of the unit cells.

A fuel cell according to an embodiment will now be described with reference to the drawings.

Figure 1:
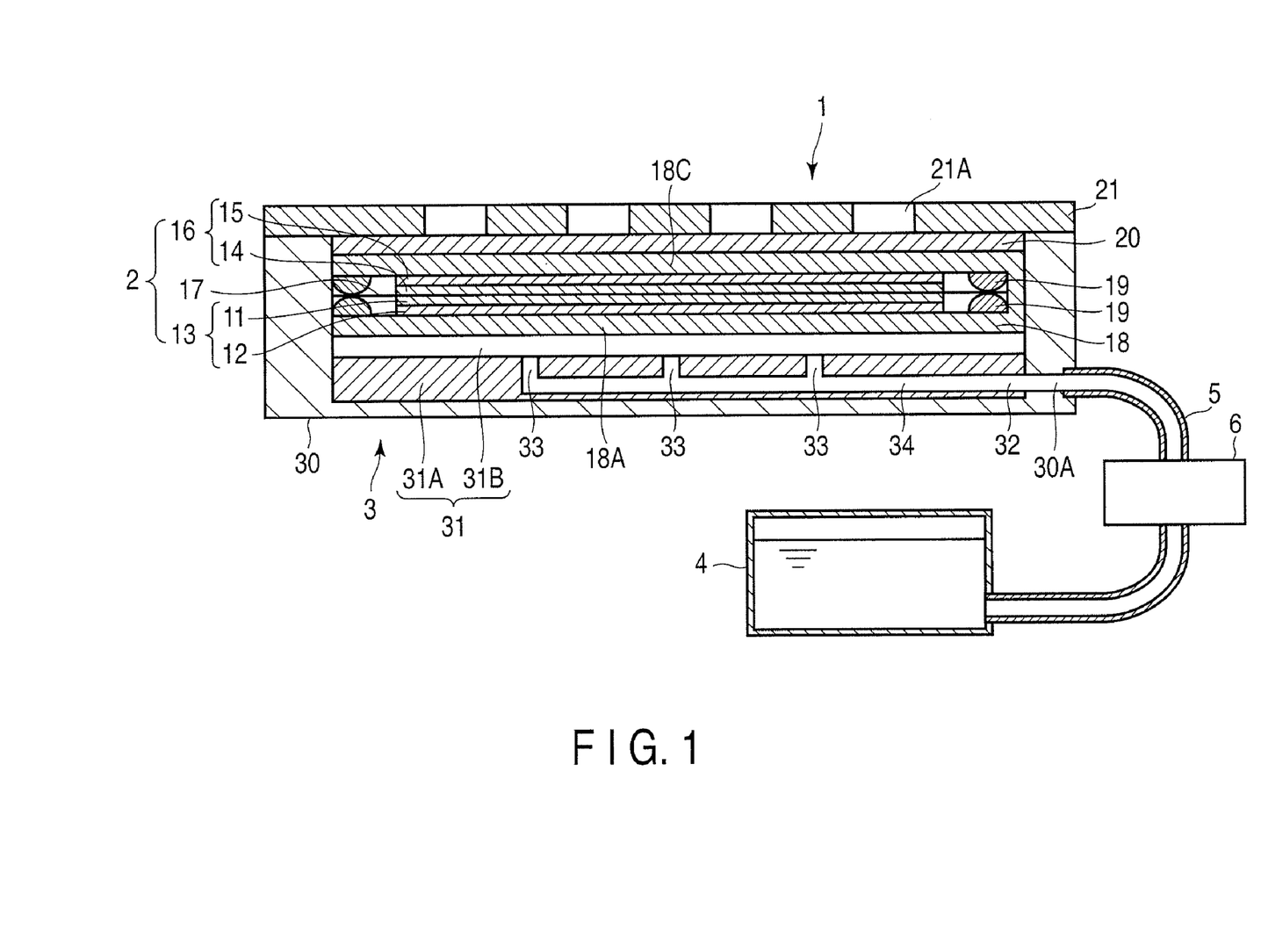
FIG. 1 is a cross-sectional view which schematically shows the structure of a fuel cell according to an embodiment of the present invention.

A fuel cell 1 is mainly composed of an MEA 2 which constitutes a power generation section, and a fuel supply mechanism 3 which supplies fuel to the MEA 2.

Specifically, in the fuel cell 1, the MEA 2 comprises an anode (also referred to as "fuel electrode") 13 including an anode catalyst layer 11 and an anode gas diffusion layer 12 disposed on the anode catalyst layer 11; a cathode (also referred to as "air electrode" or "oxidant electrode") 16 including a cathode catalyst layer 14 and a cathode gas diffusion layer 15 stacked on the cathode catalyst layer 14; and a proton (hydrogen ion)-conducting electrolyte membrane 17 which is interposed between the anode catalyst layer 11 and cathode catalyst layer 14.

Examples of catalysts included in the anode catalyst layer 11 and cathode catalyst layer 14 are elemental substances of a platinum group, such as platinum (Pt), ruthenium (Ru), rhodium (Rh), iridium (Ir), osmium (OS) and palladium (Pd), and alloys containing platinum-group elements. It is preferable to use Pt-Ru or Pt-Mo, which has high resistance to methanol or carbon monoxide, for the anode catalyst layer 11. It is preferable to use Pt or Pt-Ni for the cathode catalyst layer 14. However, the catalyst is not limited to these examples, and various substances with catalytic activity may be used. In addition, the catalyst may be either a supported catalyst using an electrically conductive support such as a carbon material, or a non-supported catalyst.

Each of the anode catalyst layer 11 or cathode catalyst layer 14 may include, for example, a fluororesin (e.g. Nafion (trade name, manufactured by DuPont) or Flemion (trade name, manufactured by Asahi Glass Co., Ltd.)) such as perfluorosulfonic acid polymer, which includes a sulfonic acid group, a hydrocarbon resin including a sulfonic acid group, or a proton-conducting agent of, e.g. an inorganic substance such as tungstic acid, phosphotungstic acid or lithium nitrate.

The proton-conducting material, which constitutes the electrolyte membrane 17, is, for example, a fluororesin (e.g. Nafion (trade name, manufactured by DuPont) or Flemion (trade name, manufactured by Asahi Glass Co., Ltd.)) such as perfluorosulfonic acid polymer, which includes a sulfonic acid group, an organic material such as a hydrocarbon resin which includes a sulfonic acid group, or an inorganic material such as tungstic acid or phosphotungstic acid. However, the proton-conducting electrolyte membrane 17 is not limited to these examples.

The anode gas diffusion layer 12, which is stacked on the anode catalyst layer 11, functions to uniformly supply fuel to the anode catalyst layer 11, and also has an electricity-collecting function of the anode catalyst layer 11. The cathode gas diffusion layer 15, which is stacked on the cathode catalyst layer 14, functions to uniformly supply an oxidant (e.g. oxygen contained in the air) to the cathode catalyst layer 14, and also has an electricity-collecting function of the cathode catalyst layer 14. The anode gas diffusion layer 12 and the cathode gas diffusion layer 15 are formed of an electrically conductive porous material such as carbon paper.

The MEA 2 is sealed by seal members 19 of, e.g. rubber-made O rings, which are disposed on the anode 13 side and cathode 16 side of the electrolyte membrane 17. Thereby, fuel leak or oxidant leak from the MEA 2 is prevented.

A plate-like member 20, which is formed of an insulating material, is disposed on the cathode 16 side of the MEA 2. The plate-like member 20 functions mainly as a moisture retention layer. Specifically, the plate-like member 20 is impregnated with part of water which is generated in the cathode catalyst layer 14, and suppresses evaporation of water. In addition, the plate-like member 20 adjusts an intake amount of air into the cathode catalyst layer 14, and promotes uniform diffusion of air. The plate-like member 20 is composed of, for example, a porous member. A concrete example of the material, of which the plate-like member 20 is formed, is a porous material of polyethylene or polypropylene.

The above-described MEA 2 is disposed between the fuel supply mechanism 3 and a cover plate 21. The cover plate 21 has a substantially rectangular outer shape, and is formed of, e.g. stainless steel (SUS). In addition, the cover plate 21 has a plurality of opening portions 21A for taking in air that is an oxidant.

The fuel supply mechanism 3 is configured to supply fuel to the anode 13 of the MEA 2. The structure of the fuel supply mechanism 3, however, is not limited to a specific one. An example of the fuel supply mechanism 3 is described below.

The fuel supply mechanism 3 includes a container 30 which is formed, for example, in a box shape. The fuel supply mechanism 3 is connected to a fuel container 4, which contains a liquid fuel, via a conduit 5. The container 30 includes a fuel introducing port 30A, and this fuel introducing port 30A and the conduit 5 are connected. The container 30 is composed of, for example, a resin-made container. A material having resistance to liquid fuel is chosen as the material of which the container 30 is formed.

The fuel supply mechanism 3 includes a fuel supply unit 31 which supplies fuel in a plane direction of the anode 13 of the MEA 2, while dispersing and diffusing the fuel. In this example, in particular, a description is given of the structure in which the fuel supply unit 31 includes a fuel distribution plate 31A. However, the fuel supply unit 31 may have other structure.

Specifically, the fuel distribution plate 31A includes a fuel injection port 32 and a plurality of fuel discharge ports 33, and is configured such that the fuel injection port 32 and the fuel discharge ports 33 are connected via a fuel passage such as a fine tube 34.

The fuel injection port 32 communicates with the fuel introducing port 30A of the container 30. Thereby, the fuel injection port 32 of the fuel distribution plate 31A is connected to the fuel container 4 via the conduit 5. The fuel discharge ports 33 are provided, for example, at 128 locations, and discharge liquid fuel or an evaporated component thereof.

The liquid fuel, which has been injected from the fuel injection port 32, is introduced to the plural fuel discharge ports 33 via the multiply branched fine tube 34. By using the fuel distribution plate 31A, the liquid fuel, which has been injected from the fuel injection port 32, can uniformly be distributed to the plural fuel discharge ports 33, regardless of the direction and position. Therefore, the uniformity of an electricity generation reaction in the plane of the MEA 2 can further be enhanced.

Moreover, by connecting the fuel injection port 32 and the plural fuel discharge ports 33 by the fine tube 34, such a design is possible that more fuel is supplied to specified locations of the fuel cell 1. This contributes to the improvement of the uniformity of the degree of power generation of the MEA 2.

The MEA 2 is disposed such that the anode 13 thereof is opposed to the fuel discharge ports 33 of the above-described fuel distribution plate 31A. The cover plate 21 is fixed to the container 30 by a method of caulking or screwing in the state in which the MEA 2 is held between the cover plate 21 and the fuel supply mechanism 3. Thereby, a power generation unit of the fuel cell (DMFC) 1 is constructed.

The fuel supply unit 31 should desirably be configured such that a space functioning as a fuel diffusion chamber 31B is formed between the fuel distribution plate 31A and the MEA 2. The fuel diffusion chamber 31B has a function of promoting evaporation even when liquid fuel is discharged from the fuel discharge ports 33, and promoting diffusion in the plane direction.

A support member, which supports the MEA 2 from the anode 13 side, may be disposed between the MEA 2 and the fuel supply unit 31.

In addition, at least one porous body may be disposed between the MEA 2 and the fuel supply unit 31.

A liquid fuel corresponding to the MEA 2 is contained in the fuel container 4. Examples of the liquid fuel include methanol fuels such as methanol aqueous solutions of various concentrations, or pure methanol. The liquid fuel is not necessarily limited to the methanol fuels. The liquid fuel may be, for instance, an ethanol fuel such as an ethanol aqueous solution or pure ethanol, a propanol fuel such as a propanol aqueous solution or pure propanol, a glycol fuel such as a glycol aqueous solution or pure glycol, dimethyl ether, formic acid, or other liquid fuel. In any case, the liquid fuel corresponding to the MEA 2 is contained in the fuel container 4.

A pump 6 may be provided on the conduit 5. The pump 6 is not a circulating pump for circulating fuel, but a fuel supply pump for feeding liquid fuel from the fuel container 4 to the fuel supply unit 31. The fuel, which is supplied from the fuel supply unit 31 to the MEA 2, is used in a power generation reaction, and then the fuel is not circulated and returned to the fuel container 4.

In the fuel cell 1 of this embodiment, the fuel is not circulated. Thus, this fuel cell 1 differs from the conventional active-type fuel cell, and the reduction in size of the apparatus is not hindered. Moreover, in the fuel cell 1 of this embodiment, the pump 6 is used for supplying liquid fuel. Thus, this fuel cell 1 differs from the conventional pure passive type, such as an internal evaporation type. In the fuel cell 1 shown in FIG. 1, a method called "semi-passive type", for example, is applied.

In the fuel cell 1 of this embodiment, liquid fuel is intermittently supplied from the fuel container 4 to the fuel supply unit 31 by using the pump 6. The liquid fuel, which is fed by the pump 6, is uniformly supplied to the entire plane of the anode 13 of the MEA 2 via the fuel supply unit 31.

Specifically, fuel is uniformly supplied in a plane direction of each anode 13 of a plurality of unit cells C, and thereby a power generation reaction is caused to occur. Preferably, the driving operation of the pump 6 for fuel supply should be controlled, based on the output of the fuel cell 1, temperature information, and driving information of an electronic apparatus to which power is supplied.

As has been described above, the fuel, which is discharged from the fuel supply unit 31, is supplied to the anode 13 of the MEA 2. In the MEA 2, the fuel diffuses in the anode gas diffusion layer 12, and is supplied to the anode catalyst layer 11. When methanol fuel is used as the liquid fuel, an internal reforming reaction of methanol, which is shown in formula (1) below, occurs in the anode catalyst layer 11. In the meantime, when pure methanol is used as the methanol fuel, water, which is generated in the cathode catalyst layer 14, or water in the electrolyte membrane 17 is caused to react with the methanol, and the internal reforming reaction shown in formula (1) is caused to occur. Alternatively, an internal reforming reaction is caused to occur by another reaction mechanism which requires no water.

$$CH_3OH + H_2O \rightarrow CO_2 + 6H^+ + 6e^- \quad (1)$$

The electrons (e⁻) generated in this reaction are led to the outside via an electricity-collecting member, and drive, as so-called electricity, a mobile electronic apparatus or the like. Then, the electrons (e⁻) are led to the cathode 16 via the electricity-collecting member. The protons (H⁺) generated in the internal reforming reaction of formula (1) are led to the cathode 16 via the electrolyte membrane 17. Air is supplied, as an oxidant, to the cathode 16. The electrons (e⁻) and the protons (H⁺), which have reached the cathode 16, react with oxygen in the air in the cathode catalyst layer 14 according to a formula (2) below, and water is generated by this reaction.

$$6e^- + 6H^+ + (3/2)O_2 \rightarrow 3H_2O \quad (2)$$

In the above-described power generation reaction of the fuel cell 1, in order to increase electric power which is generated, it is important to smoothly cause the catalyst reaction to occur, to uniformly supply fuel to the entire electrode of the MEA 2, and to cause the entire electrode to efficiently contribute to power generation.

Figure 2:
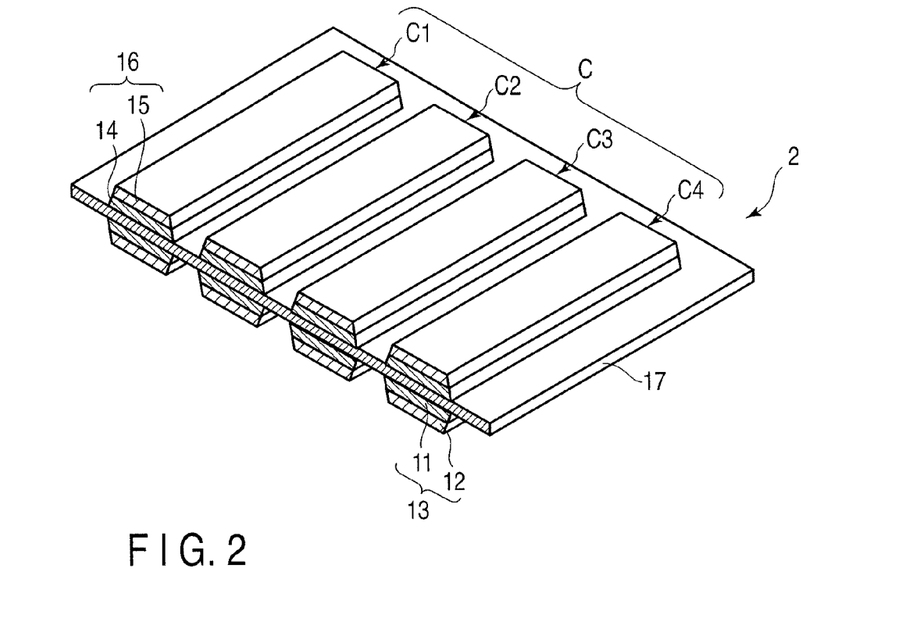
FIG. 2 is a perspective view which schematically shows a cross section of a part of an MEA in the fuel cell shown in FIG. 1.
Figure 3:
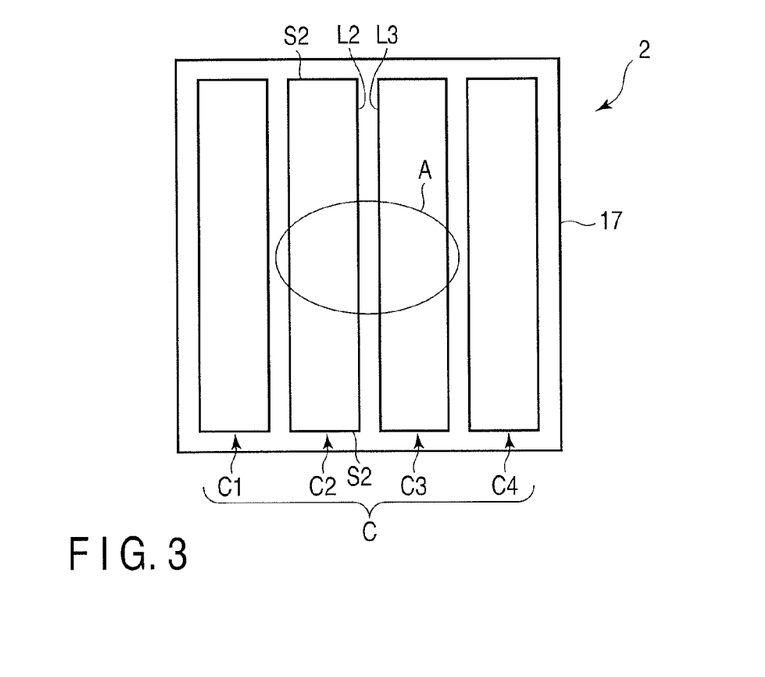
FIG. 3 is a plan view of the MEA shown in FIG. 2.

In the meantime, in the present embodiment, as shown in FIG. 2 and FIG. 3, the MEA 2 comprises a plurality of anodes 13 which are disposed at intervals on one surface of a single electrolyte membrane 17, and a plurality of cathodes 16 which are disposed at intervals on the other surface of the electrolyte membrane 17 so as to be opposed to the respective anodes 13. In the case illustrated, four anodes 13 and four cathodes 16 are provided.

The electrolyte membrane 17 is sandwiched by each of the combinations of the anodes 13 and cathodes 16, and the combinations of the anodes 13 and cathodes 16 constitute unit cells C (C1, C2, C3 and C4). In this case, the unit cells C (C1, C2, C3 and C4) are arranged on the same plane at intervals in a direction D perpendicular to the longitudinal direction of the unit cells C. The structure of the MEA 2 is not limited to this example, and may have other structures.

In the MEA 2 including the unit cells (C1, C2, C3 and C4) as shown in FIG. 2 and FIG. 3, the unit cells (C1, C2, C3 and C4) are electrically connected in series by an electricity-collecting member 18.

Specifically, the electricity-collecting member 18, as shown in FIG. 1, includes an anode electricity collector 18A and a cathode electricity collector 18C. In order to adapt to the MEA 2 shown in, e.g. FIG. 2, the electricity-collecting member 18 includes four anode electricity collectors 18A and cathode electricity collectors 18C.

Each anode electricity collector 18A is stacked on the anode gas diffusion layer 12 of each unit cell C (C1, C2, C3, C4). In addition, each cathode electricity collector 18C is stacked on the cathode gas diffusion layer 15 of each unit cell C (C1, C2, C3, C4). As the anode electricity collector 18A and cathode electricity collector 18C, use may be made of, for example, a porous film (e.g. mesh) or foil of a metallic material such as gold (Au) or nickel (Ni), or a composite member in which a high-conductivity metal, such as gold, is coated on a conductive metallic material such as stainless steel (SUS).

In the present embodiment, the thickness of at least one of the anode catalyst layer 11 and cathode catalyst layer 14 gradually decreases toward the outside.

As shown in FIG. 2, the anode catalyst layer 11 and cathode catalyst layer 14 of each of the unit cells C are formed to have such trapezoidal cross sections that the thicknesses of their end portions gradually decrease. In other words, each of the anode catalyst layer 11 and cathode catalyst layer 14 is formed in such a taper shape that the area of the top surface thereof is smaller than the area of the bottom surface which is in contact with the electrolyte membrane 17.

Figure 4:
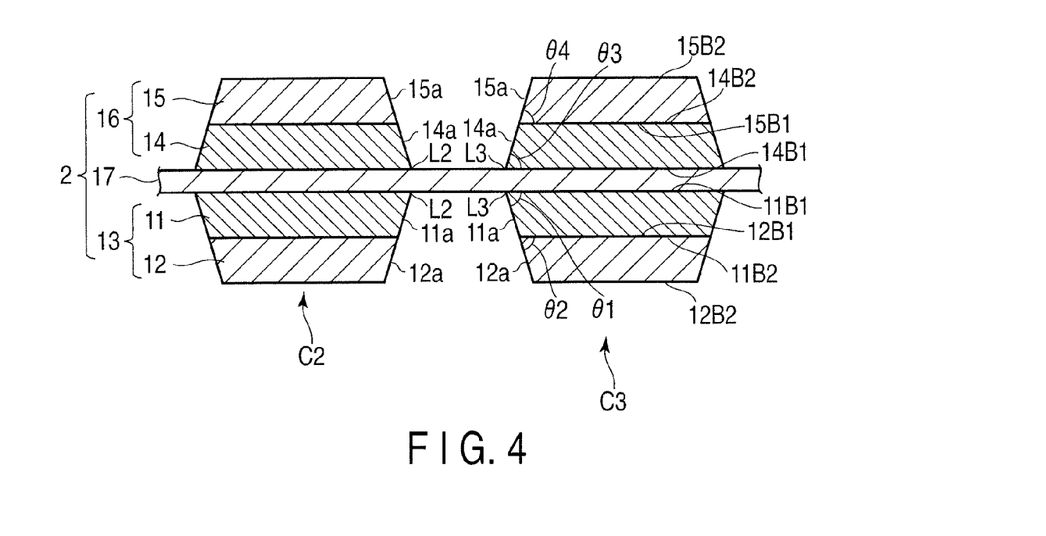
FIG. 4 is an enlarged cross-sectional view of a part A shown in FIG. 2.

To be more specific, as shown in FIG. 4, the area of a bottom surface 11B1 of the anode catalyst layer 11, which is in contact with the electrolyte membrane 17, is larger than the area of a top surface 11B2 of the anode catalyst layer 11, which is in contact with the anode gas diffusion layer 12. The anode catalyst layer 11 has a side surface 11a which connects the bottom surface 11B1 and top surface 11B2. Mutually opposed side surfaces 11a of the neighboring anode catalyst layers 11 are inclined surfaces.

It is preferable that the area of a bottom surface 12B1 of the anode gas diffusion layer 12 stacked on the anode catalyst layer 11, which is in contact with the anode catalyst layer 11, be greater than the area of a top surface 12B2 of the anode gas diffusion layer 12, which is opposite to the surface thereof in contact with the anode catalyst layer 11. The anode gas diffusion layer 12 has a side surface 12a which connects the bottom surface 12B1 and top surface 12B2. The side surface 12a is an inclined surface which is connected to the side surface 11a of the anode catalyst layer 11.

An inclination angle θ1 between the bottom surface 11B1 and side surface 11a of the anode catalyst layer 11 is equal to an inclination angle θ2 between the bottom surface 12B1 and side surface 12a of the anode gas diffusion layer 12, and both the inclination angle θ1 and the inclination angle θ2 are acute angles.

The area of a bottom surface 14B1 of the cathode catalyst layer 14, which is in contact with the electrolyte membrane 17, is larger than the area of a top surface 14B2 of the cathode catalyst layer 14, which is in contact with the cathode gas diffusion layer 15. The cathode catalyst layer 14 has a side surface 14a which connects the bottom surface 14B1 and top surface 14B2. Mutually opposed side surfaces 14a of the neighboring cathode catalyst layers 14 are inclined surfaces.

It is preferable that the area of a bottom surface 15B1 of the cathode gas diffusion layer 15 stacked on the cathode catalyst layer 14, which is in contact with the cathode catalyst layer 14, be greater than the area of a top surface 15B2 of the cathode gas diffusion layer 15, which is opposite to the surface thereof in contact with the cathode catalyst layer 14. The cathode gas diffusion layer 15 has a side surface 15a which connects the bottom surface 15B1 and top surface 15B2. The side surface 15a is an inclined surface which is connected to the side surface 14a of the cathode catalyst layer 14.

An inclination angle $\theta 3$ between the bottom surface 14B1 and side surface 14a of the cathode catalyst layer 14 is equal to an inclination angle $\theta 4$ between the bottom surface 15B1 and side surface 15a of the cathode gas diffusion layer 15, and both the inclination angle $\theta 3$ and the inclination angle $\theta 4$ are acute angles.

If attention is paid to the neighboring unit cell C2 and unit cell C3, as shown in FIG. 3 and FIG. 4, the thickness of the anode catalyst layer 11 of one unit cell C2 gradually decreases toward the other unit cell C3. Specifically, the side surface 11a of the anode catalyst layer 11 of the unit cell C2, which is formed along a side L2 facing the anode catalyst layer 11 of the unit cell C3, is an inclined surface. Similarly, the side surface 11a of the anode catalyst layer 11 of the unit cell C3, which is formed along a side L3 facing the anode catalyst layer 11 of the unit cell C2, is an inclined surface. In the respective unit cells C, both the side surfaces 11a of the mutually opposed anode catalyst layers 11 are inclined surfaces.

In addition, the thickness of the cathode catalyst layer 14 of one unit cell C2 gradually decreases toward the other unit cell C3. Specifically, the side surface 14a of the cathode catalyst layer 14 of the unit cell C2, which is formed along a side L2 facing the cathode catalyst layer 14 of the unit cell C3, is an inclined surface. Similarly, the side surface 14a of the cathode catalyst layer 14 of the unit cell C3, which is formed along a side L3 facing the cathode catalyst layer 14 of the unit cell C2, is an inclined surface. In the respective unit cells C, both the side surfaces 14a of the mutually opposed cathode catalyst layers 14 are inclined surfaces.

In the respective unit cells C, those side surfaces 11a of the anode catalyst layers 11 and those side surface 14a of the cathode catalyst layers 14, which are not mutually opposed, may not be inclined surfaces. For example, in FIG. 3, side surfaces of the unit cell C2 along sides S2, which are not opposed to the unit cell C1 and unit cell C3, may not be inclined surfaces. In addition, those side surfaces of the unit cell C1 and unit cell C4, which face outward, may not be inclined surfaces.

As described above, since the side surfaces 11a of the anode catalyst layers 11 and the side surfaces 14a of the cathode catalyst layers 14 are gently inclined surfaces, falling of catalysts from the anode catalyst layer 11 and cathode catalyst layer 14 can be prevented. In addition, since the mutually opposed side surfaces 11a of the neighboring anode catalyst layers 11 are inclined surfaces, falling of catalysts in the space between the anode catalyst layers 11 can be prevented. Moreover, since the mutually opposed side surfaces 14a of the neighboring cathode catalyst layers 14 are inclined surfaces, falling of catalysts in the space between the cathode catalyst layers 14 can be prevented.

In the case of preventing only the falling of catalysts in the anode catalyst layers 11, the thickness of the anode catalyst layer 11 of one of neighboring cells is configured to gradually decrease toward the other unit cell. Besides, in the case of preventing only the falling of catalysts in the cathode catalyst layers 14, the thickness of the cathode catalyst layer 14 of one of neighboring cells is configured to gradually decrease toward the other unit cell.

Thereby, it becomes possible to prevent a catalyst, which has fallen from the anode catalyst layer 11, from coming in contact with the neighboring anode catalyst layer 11. In addition, it becomes possible to prevent a catalyst, which has fallen from the cathode catalyst layer 14, from coming in contact with the neighboring cathode catalyst layer 14. Therefore, while the fuel cell 1 is being driven, short-circuit between the anodes 13 and between the cathodes 16 of the neighboring unit cells C can be prevented.

There are optimal angles for the inclination angle $\theta 1$ of the anode catalyst layer 11 and the inclination angle $\theta 3$ of the cathode catalyst layer 14. In this embodiment, the optimal angles for the inclination angle $\theta 1$ of the anode catalyst layer 11 and the inclination angle $\theta 3$ of the cathode catalyst layer 14 are 30° or more and 80° or less.

Next, the optimal angles for the inclination angle $\theta 1$ of the anode catalyst layer 11 of the fuel cell 1 and the inclination angle $\theta 3$ of the cathode catalyst layer 14 were verified.

To begin with, carbon paper (TGP-H-030~120manufactured by Toray Industries, Inc.) for the anode gas diffusion layer 12 was prepared. The carbon paper was compressed in the thickness direction by flat-plate pressing until the thickness decreased to ½. The pore volume ratio of the carbon paper before the compression was measured by an Archimedes method, and was found to be 75%. In addition, the pore volume ratio of the carbon paper after the compression was calculated by measuring outside dimensions and weight, and was found to be 40.5%.

Next, 10 parts by weight of carbon particles, which support platinum-ruthenium alloy particles that are catalysts, 1 part by weight of a solid content of Nafion solution DE2020 (manufactured by DuPont), and a solvent were mixed by a homogenizer, and a slurry having a solid content of about 15% was prepared. The slurry was coated on the above-described anode gas diffusion layer 12 by a die-coater spray coat method, and dried, and the anode catalyst layer 11 was formed. Thus, the anode 13 was obtained.

Besides, carbon paper (TGP-H-60 manufactured by Toray Industries, Inc.) for the cathode gas diffusion layer 15 was prepared. The pore volume ratio of the carbon paper at this time was 75%.

Next, carbon particles, which support platinum particles that are catalysts, and Nafion solution DE2020 (manufactured by DuPont) were mixed by a homogenizer, and a slurry having a solid content of about 15% was prepared. The slurry was coated on the above-described cathode gas diffusion layer 15 by a die-coater spray coat method, and dried, and the cathode catalyst layer 14 was formed. Thus, the cathode 16 was obtained.

The anode 13 and cathode 16 were cut to predetermined sizes by cutter knives. At this time, the anode 13 and cathode 16 were cut by using cutter knives with blades of various angles so that the angles of cut planes were varied.

Six samples of the anode 13, namely, sample A1 ($\theta 1=30°$), sample A2 ($\theta 1=45°$), sample A3 ($\theta 1=60°$), sample A4 ($\theta 1=75°$), sample A5 ($\theta 1=80°$) and sample A6 ($\theta 1=90°$), were prepared.

In addition, six samples of the cathode 16, namely, sample B1 (θ3=30°), sample B2 (θ3=45°), sample B3 (θ3=60°), sample B4 (θ3=75°), sample B5 (θ3=80°) and sample B6 (θ3=90°), were prepared.

In the meantime, the inclination angle θ1 of the anode catalyst layer 11 and the inclination angle θ3 of the cathode catalyst layer 14 can be measured by observing the cut planes with 10 to 100 magnifications and conducting a cross-section analysis.

Using fixed electrolyte membrane Nafion 112 (manufactured by DuPont) as the electrolyte membrane 17, this electrolyte membrane 17 and cathode 16 are first laid over each other such that the cathode catalyst layer 14 faces the electrolyte membrane 17. Then, the anode 13 is laid on that surface of the electrolyte membrane 17, which is opposite to the surface thereof on which the cathode 16 is laid, such that the anode catalyst layer 11 faces the electrolyte membrane 17. Thereafter, pressing was performed under the conditions of the temperature of 150° C. and the pressure of 30 kgf/cm$^2$, and the MEA 2 was formed.

The electrode area of each of the anode 13 and cathode 16 was set at 8 cm$^2$ of 1 cm×8 cm. The anodes 13 and cathodes 16 were arranged in four rows at intervals of 1.2 mm.

The space between the anodes 13 and the space between the cathodes 16 of samples A1 to A6 and samples B1 to B6 were observed.

Then, the MEA 2 was sandwiched between gold foils which function as the electricity-collecting member 18 having a plurality of openings for taking in air and evaporated methanol, and the anode electricity collector 18A and cathode electricity collector 18C were formed.

The stacked body of the MEA 2, anode electricity collector 18A and cathode electricity collector 18C was interposed between two resin-made frames. Rubber-made O rings functioning as the seal members 19 were clamped between the cathode 16 side of the MEA 2 and one of the frames and between the anode 13 side of the MEA 2 and the other frame, thereby applying sealing.

The frame on the anode 13 side was fixed by screwing to the fuel supply mechanism 3 via a gas/liquid separation film. A silicone sheet with a thickness of 0.1 mm was used for the gas/liquid separation film. On the other hand, the plate-like member 20 serving as a moisture retention layer with a pore volume ratio of 30% was disposed on the frame on the cathode 16 side. A stainless steel plate (SUS304) with a thickness of 2 mm, in which the opening portions 21A for taking in air are formed, was disposed as the cover plate 21 on the plate-like member 20, and fixed by screwing. The diameter of the opening portion 21A is 4 mm. The number of opening portions 21A is 64. In this manner, the fuel cell 4 was assembled.

Pure methanol was injected in the fuel container of the fuel cell 1. The fuel cell 1 was driven for 500 hr in the environment of the temperature of 25° C. and the relative humidity of 50%. The MEA 2 after the driving of 500 hr was taken out and observed. In addition, a peel distance L of the anode catalyst layer 11 of the fuel cell 1 including samples A1 to A5 and sample A6 and a peel distance L of the cathode catalyst layer 14 of the fuel cell 1 including samples B1 to B6 were measured.

Figure 5:
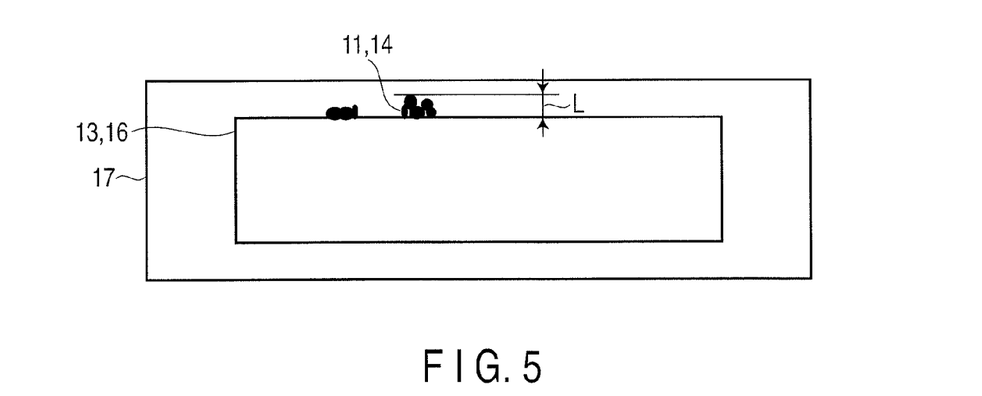
FIG. 5 is a view showing a peel distance of an anode catalyst layer and a peel distance of a cathode catalyst layer.
Figure 6:
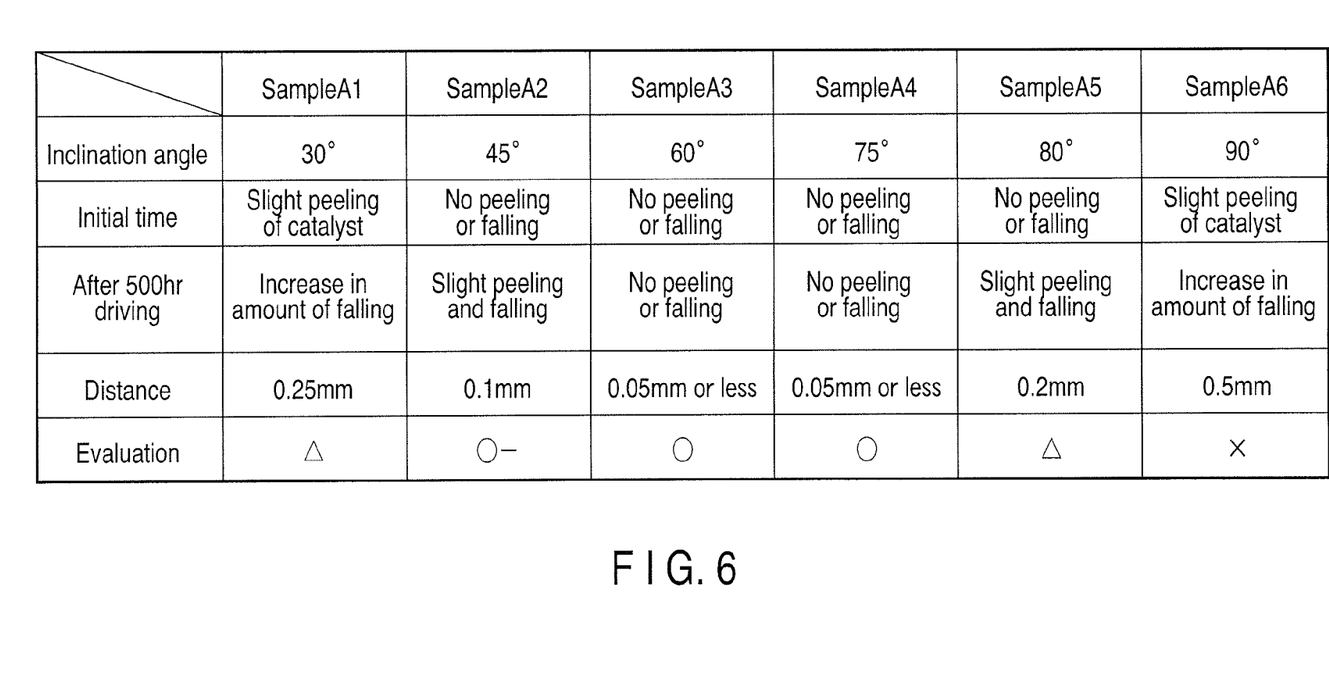
FIG. 6 is a view showing a verification result of the effect obtained by forming an inclined surface on the anode catalyst layer.
Figure 7:
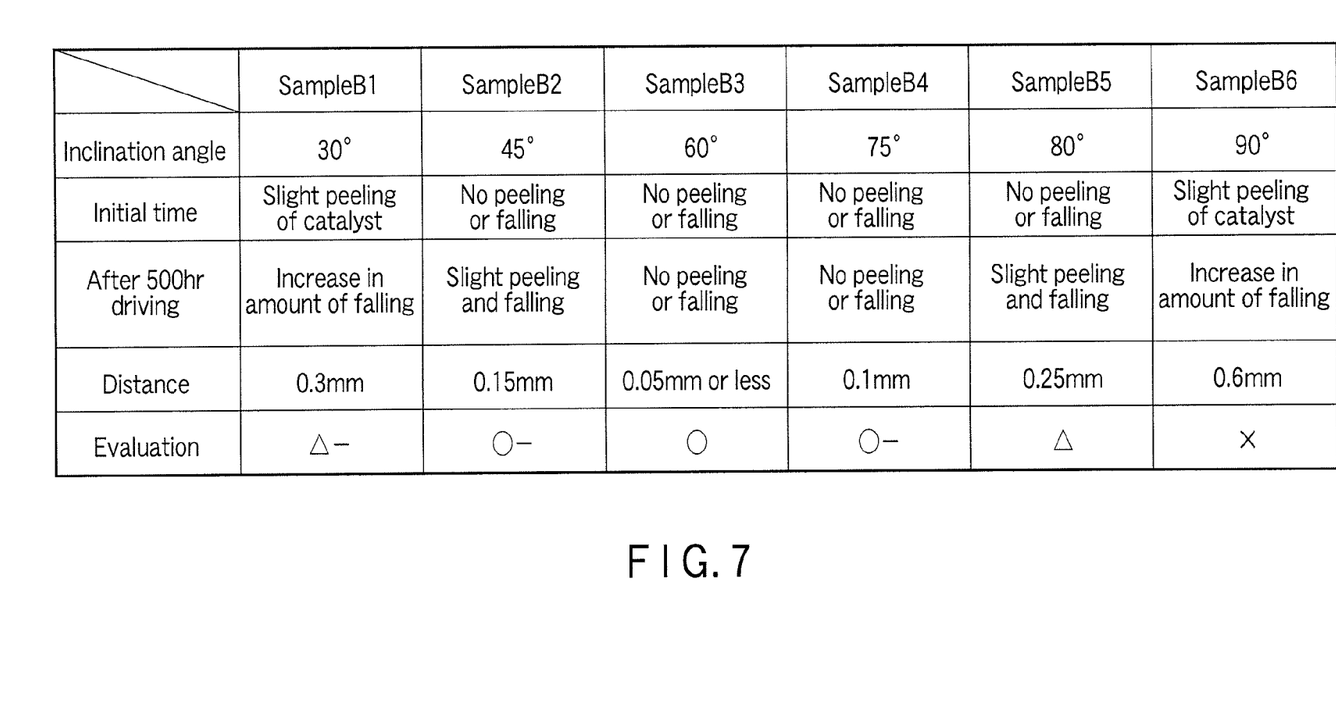
FIG. 7 is a view showing a verification result of the effect obtained by forming an inclined surface on the cathode catalyst layer.

As shown in FIG. 5, the peel distance L of the anode catalyst layer 11 is a distance between an end portion of the bottom surface of the anode catalyst layer 11 and a catalyst which has fallen at a remotest position from the anode catalyst layer 11. The peel distance L of the cathode catalyst layer 14 is a distance between an end portion of the bottom surface of the cathode catalyst layer 14 and a catalyst which has fallen at a remotest position from the cathode catalyst layer 14. FIG. 6 and FIG. 7 show measurement results thereof.

The state of the anode 13 side at the time (initial time) of formation of the MEA 2 is as follows. In sample A1, falling of a catalyst from the anode catalyst layer 11 was confirmed, and peeling of the anode catalyst layer 11 was confirmed. In sample A2 to sample A5, there was neither peeling of the anode catalyst layer 11 nor falling of a catalyst from the anode catalyst layer 11. In sample A6, falling of a catalyst from the anode catalyst layer 11 was confirmed, and peeling of the anode catalyst layer 11 was confirmed. The peeling of the anode catalyst layer 11 means that a part of the anode catalyst layer 11 is peeled from the electrolyte membrane 17 or anode gas diffusion layer 12.

The state of the cathode 16 side at the time (initial time) of formation of the MEA 2 is as follows. In sample B1, falling of a catalyst from the cathode catalyst layer 14 was confirmed, and peeling of the cathode catalyst layer 14 was confirmed. In sample B2 to sample B5, there was neither peeling of the cathode catalyst layer 14 nor falling of a catalyst from the cathode catalyst layer 14. In sample B6, falling of a catalyst from the cathode catalyst layer 14 was confirmed, and peeling of the cathode catalyst layer 14 was confirmed. The peeling of the cathode catalyst layer 14 means that a part of the cathode catalyst layer 14 is peeled from the electrolyte membrane 17 or cathode gas diffusion layer 15.

Next, the state of the anode 13 side after the driving of the fuel cell 1 for 500 hr is as follows. In sample A1, the falling of a catalyst from the anode catalyst layer 11 increased from the initial time. In sample A2 and sample A5, there was slight peeling of the anode catalyst layer 11, and slight falling of a catalyst from the anode catalyst layer 11. In sample A3 to sample A4, there was neither peeling of the anode catalyst layer 11 nor falling of a catalyst from the anode catalyst layer 11. In sample A6, the falling of a catalyst from the anode catalyst layer 11 increased from the initial time.

The state of the cathode 16 side after the driving of the fuel cell 1 for 500 hr is as follows. In sample B1, the falling of a catalyst from the cathode catalyst layer 14 increased from the initial time. In sample B2, there was slight peeling of the cathode catalyst layer 14, and slight falling of a catalyst from the cathode catalyst layer 14. In sample B3 and sample B4, there was neither peeling of the cathode catalyst layer 14 nor falling of a catalyst from the cathode catalyst layer 14. In sample B5, there was slight peeling of the cathode catalyst layer 14, and slight falling of a catalyst from the cathode catalyst layer 14. In sample B6, the falling of a catalyst from the cathode catalyst layer 14 increased from the initial time.

The interval between the neighboring anodes 13 and the interval between the cathodes 16 are 1.2 mm, respectively. In the case where the peel distance L of the catalyst is less than 0.2 mm, no short-circuit occurs between the neighboring anodes 13 or between the neighboring cathodes 16. Thus, even if the driving of the fuel cell 1 is further continued, the possibility of short-circuit is very low. In FIG. 6 and FIG. 7, the evaluation is "◯" when the peel distance L is less than 0.1 mm, and the evaluation is "◯–" when the peel distance L is 0.1 mm or more and is less than 0.2 mm.

In the case where the peel distance L is 0.2 mm or more and is less than 0.4 mm, the possibility of short-circuit between the neighboring anodes 13 and between the neighboring cathodes 16 is low. In FIG. 6 and FIG. 7, the evaluation is "Δ" when the peel distance L is 0.2 mm or more and is less than 0.3 mm, and the evaluation is "Δ–" when the peel distance L is 0.3 mm or more and is less than 0.4 mm.

In the case where the peel distance L is 0.6 mm or more, short-circuit occurs between the neighboring anodes 13 and between the neighboring cathodes 16. In the case where the peel distance L is 0.4 mm or more and is less than 0.6 mm, the possibility of short-circuit between the neighboring anodes 13 and between the neighboring cathodes 16 is low, but there is a possibility of short-circuit if the driving of the fuel cell 1 is continued. In FIG. 6 and FIG. 7, the evaluation is "X" when the peel distance L is 0.4 mm or more.

As shown in FIG. 6, in sample A6, the peel distance L of the catalyst after the driving for 500 hr was 0.5 mm, and the evaluation was "X".

On the other hand, in sample A1, the peel distance L was 0.25 mm, and the evaluation was "Δ". In sample A2, the peel distance L was 0.1 mm, and the evaluation was "○-". In sample A3, the peel distance L was 0.05 mm or less, and the evaluation was "○". In sample A4, the peel distance L was 0.05 mm or less, and the evaluation was "○". In sample A5, the peel distance L was 0.2 mm, and the evaluation was "Δ".

From these results, it was confirmed that the peel distance L of the anode catalyst layer 11 is decreased because the side surface 11a of the anode catalyst layer 11 has the inclined surface. Specifically, it is preferable that the inclination angle θ1 of the anode catalyst layer 11 be 30° or more and 80° or less, and it is more preferable that the inclination angle θ1 of the anode catalyst layer 11 be 45° or more and 75° or less.

On the other hand, as shown in FIG. 7, in sample B6, the peel distance L of the catalyst after the driving for 500 hr was 0.6 mm, and the evaluation was "X".

On the other hand, in sample B1, the peel distance L was 0.3 mm, and the evaluation was "Δ-". In sample B2, the peel distance L was 0.15 mm, and the evaluation was "○-". In sample B3, the peel distance L was 0.05 mm or less, and the evaluation was "○". In sample B4, the peel distance L was 0.1 mm, and the evaluation was "○-". In sample B5, the peel distance L was 0.25 mm, and the evaluation was "Δ".

From these results, it was confirmed that the peel distance L of the cathode catalyst layer 14 is decreased because the side surface 14a of the cathode catalyst layer 14 has the inclined surface. Specifically, it is preferable that the inclination angle θ3 of the cathode catalyst layer 14 be 30° or more and 80° or less, and it is more preferable that the inclination angle θ3 of the cathode catalyst layer 14 be 45° or more and 75° or less.

As has been described above, according to the present embodiment, it is possible to provide the fuel cell 1 which can prevent short-circuit between the neighboring anodes 13 and between the neighboring cathodes 16.

Figure 8:
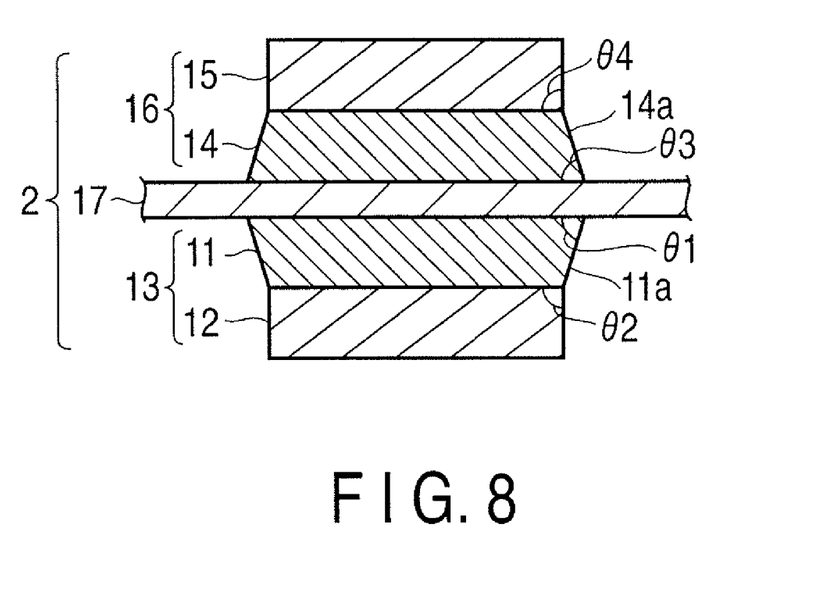
FIG. 8 is a cross-sectional view which schematically shows another structure of the MEA of the fuel cell according to the embodiment.

In the above-described embodiment, the description has been given of the example in which the inclination angle θ1 of the side surface 11a of the anode catalyst layer 11 and the inclination angle θ2 of the side surface 12a of the anode gas diffusion layer 12 are equal (θ1=θ2), and the inclination angle θ3 of the side surface 14a of the cathode catalyst layer 14 and the inclination angle θ4 of the side surface 15a of the cathode gas diffusion layer 15 are equal (θ3=θ4). However, as shown in FIG. 8, only the side surfaces 11a and 14a of the anode catalyst layer 11 and cathode catalyst layer 14 may be inclined surfaces (θ2=90°, θ4=90°).

Figure 9:
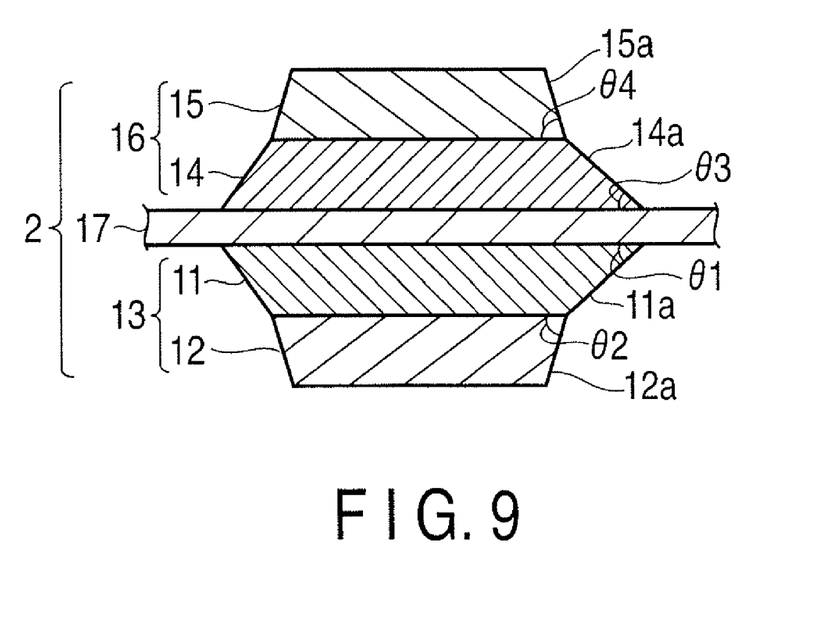
FIG. 9 is a cross-sectional view which schematically shows still another structure of the MEA of the fuel cell according to the embodiment.

In addition, as shown in FIG. 9, the inclination angle θ1 of the side surface 11a of the anode catalyst layer 11 and the inclination angle θ2 of the side surface 12a of the anode gas diffusion layer 12 may be different (θ1≠θ2). Similarly, as shown in FIG. 9, the inclination angle θ3 of the side surface 14a of the cathode catalyst layer 14 and the inclination angle θ4 of the side surface 15a of the cathode gas diffusion layer 15 may be different (θ3≠θ4).

The fuel cell 1 of the above-described embodiment exhibits effects when various kinds of liquid fuels are used, and the kind and concentration of liquid fuel are not restricted. However, the fuel supply unit 31, which supplies fuel while dispersing it in a plane direction is particularly effective when the fuel concentration is high. Thus, the fuel cell 1 of each embodiment can particularly exhibit its capability and effect when methanol with a concentration of 80 wt % or more is used as liquid fuel. Accordingly, each embodiment is suited to the fuel cell 1 which uses, as liquid fuel, a methanol aqueous solution with a methanol concentration of 80 wt % or more, or pure methanol.

Each of the above-described embodiments has been directed to the case applied to the semi-passive type fuel cell 1. However, this embodiment is not limited to this case, and may be applied to pure-passive type fuel cells of an internal evaporation type.

This embodiment is applicable to various kinds of fuel cells using liquid fuel. The concrete structures of the fuel cell and the supply condition of fuel are not particularly limited. This embodiment is applicable to various modes in which all of fuel supplied to the MEA is vapor of liquid fuel, all of fuel is liquid fuel, or part of fuel is vapor of liquid fuel which is supplied in a liquid state.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A fuel cell comprising a membrane electrode assembly including a plurality of unit cells which comprise:
   an electrolyte membrane;
   an anode including:
      anode catalyst layers arranged at intervals on a first surface of the electrolyte membrane, and
      anode gas diffusion layers stacked on the anode catalyst layers; and
   a cathode including:
      cathode catalyst layers arranged at intervals on a second surface of the electrolyte membrane and opposed to the anode catalyst layers, respectively, and
      cathode gas diffusion layers stacked on the cathode catalyst layers,
   wherein:
      a thickness of at least one of the anode catalyst layer and the cathode catalyst layer of one of the unit cells gradually decreases toward a neighboring unit cell,
      the anode catalyst layer includes:
         a bottom surface in contact with the electrolyte membrane,
         a top surface in contact with the anode gas diffusion layer, and
         a side surface connecting the bottom surface and the top surface, and
      an inclination angle between the bottom surface and the side surface is 30° or more and 80° or less.

2. The fuel cell according to claim 1, wherein an area of the bottom surface is greater than an area of the top surface.

3. A fuel cell comprising a membrane electrode assembly including a plurality of unit cells which comprise:
an electrolyte membrane;
an anode including:
anode catalyst layers arranged at intervals on a first surface of the electrolyte membrane, and
anode gas diffusion layers stacked on the anode catalyst layers; and
a cathode including:
cathode catalyst layers arranged at intervals on a second surface of the electrolyte membrane and opposed to the anode catalyst layers, respectively, and
cathode gas diffusion layers stacked on the cathode catalyst layers,
wherein:
a thickness of at least one of the anode catalyst layer and the cathode catalyst layer of one of the unit cells gradually decreases toward a neighboring unit cell,
the cathode catalyst layer includes:
a bottom surface in contact with the electrolyte membrane,
a top surface in contact with the cathode gas diffusion layer, and
a side surface connecting the bottom surface and the top surface, and
an inclination angle between the bottom surface and the side surface is 30° or more and 80° or less.

4. The fuel cell according to claim 3, wherein an area of the bottom surface is greater than an area of the top surface.

5. A fuel cell comprising a membrane electrode assembly including a plurality of unit cells which comprise:
an electrolyte membrane;
an anode including:
anode catalyst layers arranged at intervals on a first surface of the electrolyte membrane, and
anode gas diffusion layers stacked on the anode catalyst layers; and
a cathode including:
cathode catalyst layers arranged at intervals on a second surface of the electrolyte membrane and opposed to the anode catalyst layers, respectively, and
cathode gas diffusion layers stacked on the cathode catalyst layers,
wherein:
a thickness of at least one of the anode catalyst layer and the cathode catalyst layer of one of the unit cells gradually decreases toward a neighboring unit cell,
the anode catalyst layer includes:
a first bottom surface in contact with the electrolyte membrane,
a first top surface in contact with the anode gas diffusion layer, and
a first side surface connecting the first bottom surface and the first top surface,
the cathode catalyst layer includes:
a second bottom surface in contact with the electrolyte membrane,
a second top surface in contact with the cathode gas diffusion layer, and
a second side surface connecting the second bottom surface and the second top surface,
a first inclination angle between the first bottom surface and the first side surface is 30° or more and 80° or less, and
a second inclination angle between the second bottom surface and the second side surface is 30° or more and 80° or less.

* * * * *